United States Patent
Yu et al.

(10) Patent No.: US 10,474,881 B2
(45) Date of Patent: *Nov. 12, 2019

(54) VIDEO RETRIEVAL SYSTEM BASED ON LARGER POSE FACE FRONTALIZATION

(71) Applicant: NEC Laboratories America, Inc., Princeton, NJ (US)

(72) Inventors: Xiang Yu, Mountain View, CA (US); Kihyuk Sohn, Fremont, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 96 days.

This patent is subject to a terminal disclaimer.

(21) Appl. No.: 15/888,693

(22) Filed: Feb. 5, 2018

(65) Prior Publication Data

US 2018/0268055 A1    Sep. 20, 2018

Related U.S. Application Data

(60) Provisional application No. 62/471,920, filed on Mar. 15, 2017.

(51) Int. Cl.
*G06K 9/00* (2006.01)
*G06T 19/20* (2011.01)
(Continued)

(52) U.S. Cl.
CPC ......... *G06K 9/00288* (2013.01); *G06F 16/71* (2019.01); *G06F 16/743* (2019.01);
(Continued)

(58) Field of Classification Search
CPC ........... G06K 9/00288; G06K 9/00899; G06K 9/00275; G06K 9/00208; G06K 9/00214;
(Continued)

(56) References Cited

U.S. PATENT DOCUMENTS

| 7,756,325 | B2 * | 7/2010 | Vetter | G06K 9/00208 382/154 |
|---|---|---|---|---|
| 8,345,114 | B2 * | 1/2013 | Ciuc | G06K 9/00221 348/222.1 |

(Continued)

OTHER PUBLICATIONS

Blanz et al., Face Recognition Based on Fitting a 3D Morphable Model, IEEE Transactions on Pattern Analysis and Machine Intelligence, vol. 25, No. 9, Sep. 2003.*

(Continued)

*Primary Examiner* — John B Strege
(74) *Attorney, Agent, or Firm* — Joseph Kolodka

(57) ABSTRACT

A video retrieval system is provided that includes a server for retrieving video sequences from a remote database responsive to a text specifying a face recognition result as an identity of a subject of an input image. The face recognition result is determined by a processor of the server, which estimates, using a 3DMM conditioned Generative Adversarial Network, 3DMM coefficients for the subject of the input image. The subject varies from an ideal front pose. The processor produces a synthetic frontal face image of the subject of the input image based on the input image and coefficients. An area spanning the frontal face of the subject is made larger in the synthetic than in the input image. The processor provides a decision of whether the synthetic image subject is an actual person and provides the identity of the subject in the input image based on the synthetic and input images.

20 Claims, 9 Drawing Sheets

(51) Int. Cl.
*G06K 9/46* (2006.01)
*G06K 9/62* (2006.01)
*G06F 16/71* (2019.01)
*G06F 16/74* (2019.01)
*G06F 16/783* (2019.01)

(52) U.S. Cl.
CPC ....... *G06F 16/784* (2019.01); *G06K 9/00201* (2013.01); *G06K 9/00208* (2013.01); *G06K 9/00214* (2013.01); *G06K 9/00255* (2013.01); *G06K 9/00275* (2013.01); *G06K 9/00771* (2013.01); *G06K 9/00899* (2013.01); *G06K 9/4628* (2013.01); *G06K 9/6256* (2013.01); *G06T 19/20* (2013.01); *G06T 2210/44* (2013.01)

(58) Field of Classification Search
CPC ............. G06K 9/4628; G06K 9/00771; G06K 9/00201; G06K 9/6256; G06K 9/00255; G06T 19/20; G06T 2210/44; G06F 16/784; G06F 16/71; G06F 16/743
See application file for complete search history.

(56) References Cited

U.S. PATENT DOCUMENTS

| | | | |
|---|---|---|---|
| 9,323,980 B2* | 4/2016 | Sun | G06K 9/00281 |
| 2002/0106114 A1* | 8/2002 | Yan | G06K 9/00288 |
| | | | 382/118 |
| 2011/0135153 A1* | 6/2011 | Tsurumi | G06K 9/00295 |
| | | | 382/103 |
| 2016/0379050 A1* | 12/2016 | Tian | G06K 9/00281 |
| | | | 382/118 |
| 2017/0053156 A1* | 2/2017 | Chen | G06K 9/00234 |
| 2018/0137383 A1* | 5/2018 | Yao | G06K 9/00275 |
| 2018/0253866 A1* | 9/2018 | Jain | G06K 9/628 |

OTHER PUBLICATIONS

Goodfellow et al., Generative Adversarial Nets, Jun. 2014.*
Zhu, et al., "Face Alignment Across Large Poses: A 3D Solution", arXiv:1511.07212v1 [cs.CV], Nov. 2015, 11 pages.
Zhen, "Learning Face Representation from Scratch", arXiv:1411.7923v1 [cs.CV], Nov. 2014, 9 pages.

* cited by examiner

VIDEO RETRIEVAL SYSTEM BASED ON LARGER POSE FACE FRONTALIZATION

RELATED APPLICATION INFORMATION

This application claims priority to provisional application Ser. No. 62/471,920, filed on Mar. 15, 2017, incorporated herein by reference. This application is related to an application entitled "Face Recognition Using Larger Pose Face Frontalization", having attorney docket number 16095A, and which is incorporated by reference herein in its entirety. This application is related to an application entitled "Video Surveillance System Based On Larger Pose Face Frontalization", having attorney docket number 16095C, and which is incorporated by reference herein in its entirety.

BACKGROUND

Technical Field

The present invention relates to video retrieval, and more particularly to a video retrieval system based on larger pose face frontalization.

Description of the Related Art

Face analysis is a traditional and yet challenging field in applications involving human-computer interaction and computer vision. Face recognition is one of the most important tasks. Although deep face recognition has achieved significant improvement, it has been observed that those general recognition engines suffer from large accuracy drop when dealing with large pose variant faces. Learning pose-invariant features is one solution, but needs expensively labeled large scale data and carefully designed feature learning algorithms. Hence, there is a need for an improved approach for dealing with large pose variant faces.

SUMMARY

According to an aspect of the present invention, a video retrieval system is provided. The video retrieval system includes a requesting server, configured to retrieve a set of video sequences from a remote database of multiple video sequences responsive to an input text specifying a face recognition result in a form of an identity of a subject of an input image. The face recognition result is determined by a processor of the requesting server. The processor is configured to estimate, using a three-dimensional Morphable Model (3DMM) conditioned Generative Adversarial Network (GAN), 3DMM coefficients for the subject of the input image. The subject varies from an ideal front pose. The processor is further configured to produce, using an image generator, a synthetic frontal face image of the subject of the input image based on the input image and the 3DMM coefficients. An area spanning the frontal face of the subject is made larger in the synthetic frontal face image than in the input image. The processor is also configured to provide, using a discriminator, a decision indicative of whether the subject of the synthetic frontal face image is an actual person. The processor is additionally configured to provide, using a face recognition engine, the identity of the subject in the input image based on the synthetic frontal face image and the input image.

According to another aspect of the present invention, a computer-implemented method is provided for video retrieval. The method includes configuring a requesting server to retrieve a set of video sequences from a remote database of multiple video sequences responsive to an input text specifying a face recognition result in a form of an identity of a subject of an input image. The face recognition result is determined by estimating, by a processor of the requesting server using a three-dimensional Morphable Model (3DMM) conditioned Generative Adversarial Network (GAN), 3DMM coefficients for the subject of the input image. The subject varies from an ideal front pose. The face recognition result is further determined by producing, by the processor using an image generator, a synthetic frontal face image of the subject of the input image based on the input image and the 3DMM coefficients. An area spanning the frontal face of the subject is made larger in the synthetic frontal face image than in the input image. The face recognition result is also determined by providing, by the processor using a discriminator, a decision indicative of whether the subject of the synthetic frontal face image is an actual person. The face recognition result is additionally determined by providing, by the processor using a face recognition engine, the identity of the subject in the input image based on the synthetic frontal face image and the input image.

According to yet another aspect of the present invention, a computer program product is provided for video retrieval. The computer program product includes a non-transitory computer readable storage medium having program instructions embodied therewith. The program instructions are executable by a computer to cause the computer to perform a method. The method includes configuring a requesting server to retrieve a set of video sequences from a remote database of multiple video sequences responsive to an input text specifying a face recognition result in a form of an identity of a subject of an input image. The face recognition result is determined by estimating, by a processor of the requesting server using a three-dimensional Morphable Model (3DMM) conditioned Generative Adversarial Network (GAN), 3DMM coefficients for the subject of the input image. The subject varies from an ideal front pose. The face recognition result is further determined by producing, by the processor using an image generator, a synthetic frontal face image of the subject of the input image based on the input image and the 3DMM coefficients. An area spanning the frontal face of the subject is made larger in the synthetic frontal face image than in the input image. The face recognition result is also determined by providing, by the processor using a discriminator, a decision indicative of whether the subject of the synthetic frontal face image is an actual person. The face recognition result is additionally determined by providing, by the processor using a face recognition engine, the identity of the subject in the input image based on the synthetic frontal face image and the input image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to a video retrieval system based on larger pose face frontalization. As used herein, the term "larger" in "larger pose face frontalization" refers to providing a larger face pose range variance than conventional approaches. As noted below, in an embodiment, such face pose range variance can go up to 90 degree cases, i.e., profile views.

In an embodiment, the present invention achieves a frontal or head pose normalized face image from a head pose-variant face image.

In an embodiment, the present invention performs face frontalization under various head poses, including extreme profile views, with a much smaller training set as compared to conventional prior art approaches. In an embodiment, a deep 3D Morphable Model (3DMM) conditioned Generative Adversarial Network (GAN) is provided to generate an image level frontalized output. The framework of the present invention is different from both general GAN and 3DMM based modeling. The 3DMM is seamlessly incorporated into a GAN structure and is expected to provide prior shape and appearance information for fast convergence and less training data, which also supports end-to-end training. The 3DMM conditioned GAN employs a discriminator and generator loss as well as a masked symmetry loss and an identity loss.

Hence, in an embodiment, a novel generative adversarial network (GAN) framework is provided that has a deep 3DMM structure to achieve large pose face frontalization including 90 degree cases, thus expanding the pose range to profile view.

Compared to other solutions directed to pose variation, the present invention does not require the encoder to be an identity preserving representation. Rather, the encoder and decoder structures are allowed to train end-to-end from scratch. The recognition engine serves as a discriminator to adversarially regularize the generated image with similar identity. Moreover, the deep 3DMM structure is employed to provide pose information and also the prior shape and appearance, which boosts shape estimation and identity preservation. To effectively drive the network training, several loss cues are provided such as image level reconstruction loss, masked symmetry loss, and recognition loss. Experiments on landmark localization, 3D reconstruction and face recognition consistently show that the present invention finely reconstructs the geometry of the face and also enhances the recognition performance under large pose variations.

Figure 1:
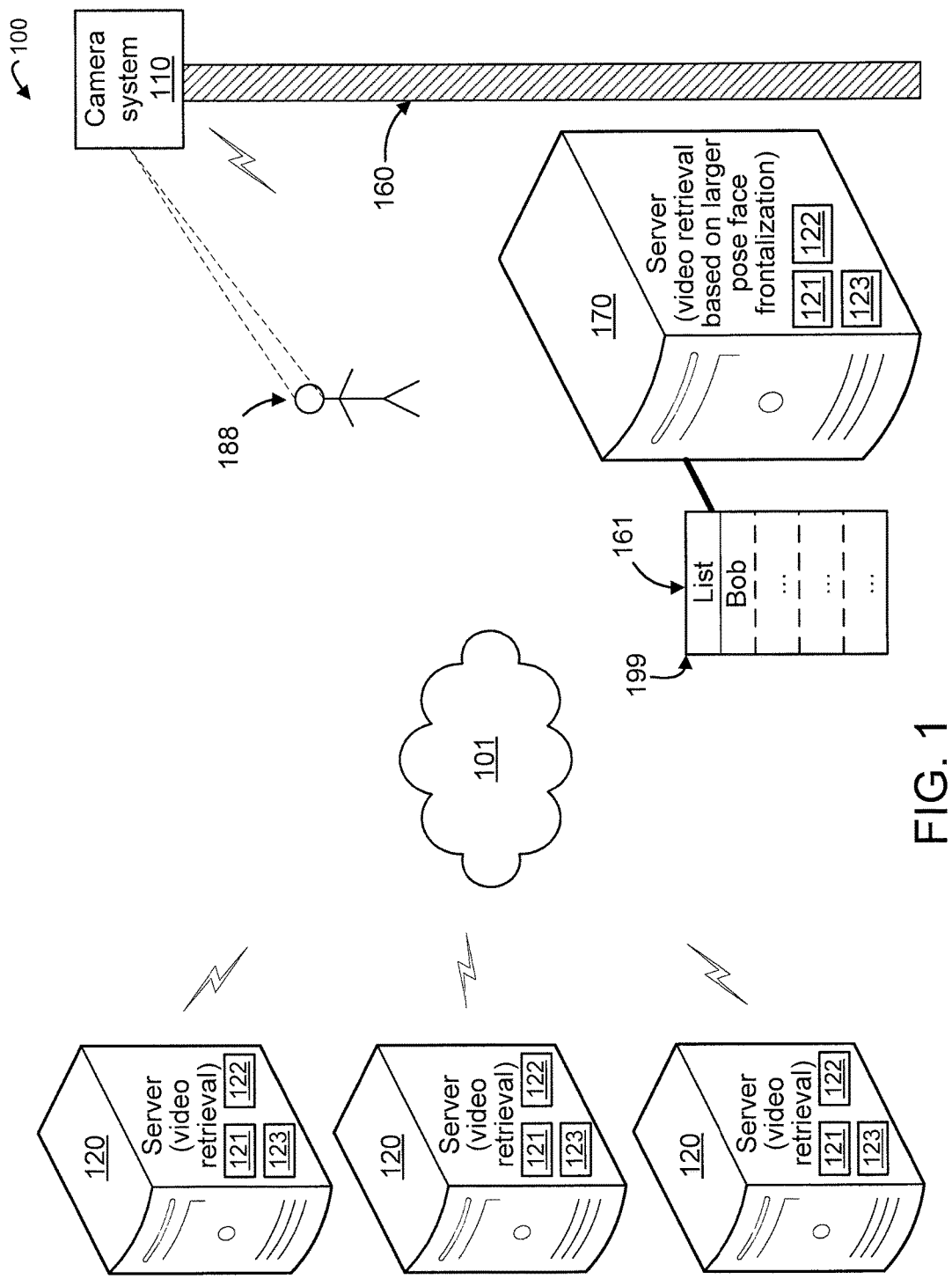
FIG. 1 shows an exemplary system for video retrieval, in accordance with an embodiment of the present invention.

FIG. 1 shows an exemplary system 100 for video retrieval, in accordance with an embodiment of the present invention. In an embodiment, the system 100 can use employ larger pose face frontalization in order to recognize one or more persons in a video and then retrieve other videos that include the same one or more persons.

The system 100 includes a camera system 110. While a single camera system 110 is shown in FIG. 1 for the sakes of illustration and brevity, it is to be appreciated that multiple camera systems can be also used, while maintaining the spirit of the present invention. The camera system 110 is configured to captures a video sequence formed from a set of input video frames that can include one or more objects.

In the embodiment of FIG. 1, the camera system 110 is mounted on a mounting entity 160. For the sake of illustration, the mounting entity 160 is a pole. While a pole 160 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 110 can be mounted in or on any of the following: a building; and so forth. The preceding examples are merely illustrative.

The camera system 110 can be a wireless camera system having its own antenna(s) or can use one or more antennas included on the pole 160 (or other mounting entity (e.g., building, drone, etc.) to which the camera system 110 is mounted or proximate).

The system 100 further includes a set of servers (with each member of the set designated by the figure reference numeral 120) and a server 170 interconnected by one or more networks (collectively denoted by the figure reference numeral 101). While only one server 170 is shown, there can be more than one server similarly configured as server 170 in other embodiments of the present invention. The server 170 is configured to perform video retrieval, based on face recognition using larger pose face frontalization in accordance with the present invention. Such video retrieval can be with respect to a (video) database implemented across the set of servers 120, which can be configured to store videos (where the set includes one or more members, with the example of FIG. 1 showing 3 members). The set of servers 120 can include any number of members, depending upon the implementation. Similarly, there can be any number of servers similarly configured to server 170, while maintaining the spirit of the present invention.

In an embodiment, the server 170 is configured to perform face recognition using larger pose face frontalization in accordance with the present invention. The server 170 can send text indicative of the identity of a recognized person 188, where such recognized person 188 may be included in one or more of the videos stored on one or more of servers 120. In an embodiment, one of the servers 120 can then manage a local search across itself and the other servers in the set 120 (or across simply one server (e.g., itself or another server) or a subset, depending upon the implementation) in order to search for and retrieve relevant videos to the identity to send to server 170. The text resident on the servers 120 and used for matching purposes against the text (identity information) sent from server 170 can be obtained by any means, as readily appreciated by one of ordinary skill in the art. Moreover, in the case of multiple servers 170 providing text, in an embodiment, the servers 120 can be managed to store descriptions in all of the servers 120 in the set, but only store the corresponding videos in ones of the servers 120 closest to commonly requesting ones of the servers 170 to shorten transmission time and well as overall storage requirements. For example, in an embodiment, data can be moved between the servers 120 in order to place certain videos closest to the servers 170 that often (or are expected to) request those videos.

The server 170 can be located remote from, or proximate to, the camera system 110. Each of the servers 120 and 170 can include a processor 121, a memory 122, and a wireless transceiver 123. The server 170 can further include a display device 161 for displaying videos and text (e.g., identities of recognized persons). In the case of the servers 120, the memory 122 can be configured to implement a database. In an embodiment, the database is a distributed database implemented across all or a subset (having more than one member) of the servers 120. In another embodiment, one of the servers 120 can implement the database in its memory 122. These and other variations of system 100 are readily contemplated by one of ordinary skill in the art, given the teachings of the present invention provided herein, while maintaining the spirit of the present invention.

Accordingly, some exemplary suitable applications to which the present invention can be applied can include any applications where video retrieval can prove useful such as in video media purchasing, video media renting, shopping, analysis, and so forth. It is to be appreciated that the preceding applications are merely illustrative and, thus, other applications can also be used, while maintaining the spirit of the present invention.

Figure 2:
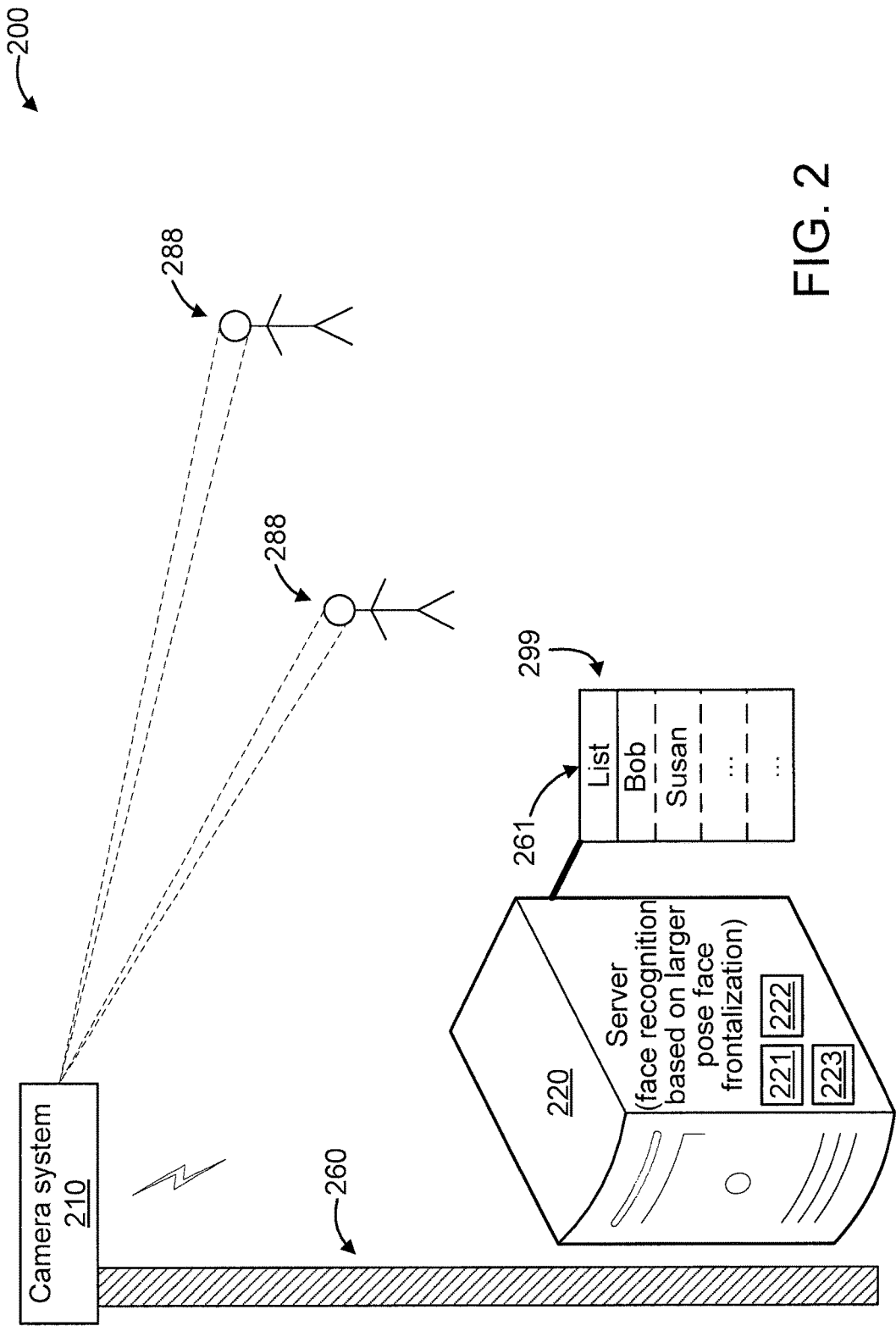
FIG. 2 shows an exemplary system for face recognition using larger pose face frontalization, in accordance with an embodiment of the present invention.

FIG. 2 shows an exemplary system 200 for face recognition using larger pose face frontalization, in accordance with an embodiment of the present invention.

The system 200 includes a camera system 210. While a single camera system 210 is shown in FIG. 2 for the sakes of illustration and brevity, it is to be appreciated that multiple camera systems can be also used, while maintaining the spirit of the present invention.

In the embodiment of FIG. 2, the camera system 210 is mounted on a mounting entity 260. For the sake of illustration, the mounting entity 260 is a pole. While a pole 260 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 210 can be mounted in or on any of the following: a building; a drone; a vehicle; and so forth. The preceding examples are merely illustrative.

The camera system 210 can be a wireless camera system having its own antenna(s) or can use one or more antennas included on the pole 260 (or other mounting entity (e.g., building, drone, vehicle, etc.) to which the camera system 210 is mounted or proximate).

The system 200 further includes a server 220 configured to perform face recognition using larger pose face frontalization. The face recognition can involve recognizing a person 288 using face recognition. The face recognition can further involve performing one or more actions (e.g., in response to particular face recognition results). The server 220 can be located remote from, or proximate to, the camera system 210. The server 220 can include, e.g., a processor 221, a memory 222, and a wireless transceiver 223. The processor 221 and the memory 222 of the remove server 220 can be configured to perform face recognition based on images received from the camera system 210 by the (the wireless transceiver 223 of) the remote server 220. In this way, a list 299 of recognized persons can be provided for any of a myriad of possible application uses relating to face recognition. Such application uses can involve one or more actions performed responsive to the list, as readily appreciated by one of ordinary skill in the art. The server 220 can further include a display device 261 for displaying the list 299 of recognized persons.

Accordingly, some exemplary suitable environments to which the present invention can be applied can include any environments where face recognition can be used. For example, exemplary suitable environments include, but are not limited to, an environment to be surveilled, a sports or other event, a battle field, a riot scenario, a picketing scenario, video analysis, a mass transit hub, and so forth.

Figure 3:
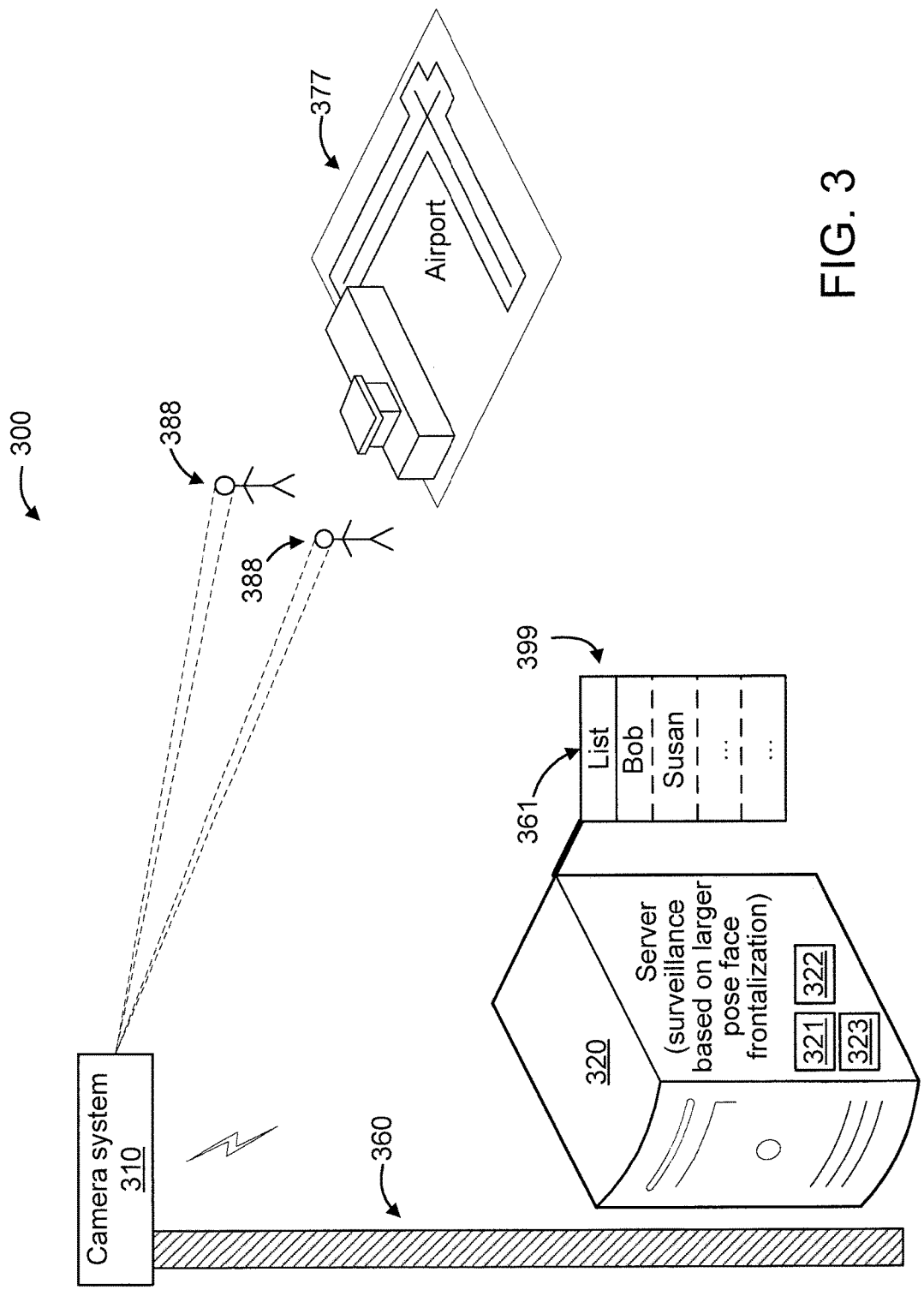
FIG. 3 shows an exemplary system for video surveillance based on face recognition with larger pose face frontalization, in accordance with an embodiment of the present principles.

FIG. 3 shows an exemplary system 300 for video surveillance based on face recognition with larger pose face frontalization, in accordance with an embodiment of the present principles.

The system 300 includes a camera system 310. While a single camera system 310 is shown in FIG. 3 for the sakes of illustration and brevity, it is to be appreciated that multiple camera systems can be also used, while maintaining the spirit of the present invention.

In the embodiment of FIG. 3, the camera system 310 is mounted on a mounting entity 360. For the sake of illustration, the mounting entity 360 is a pole. While a pole 360 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 310 can be mounted in or on any of the following: a building; and so forth. The preceding examples are merely illustrative.

The camera system 310 can be a wireless camera system having its own antenna(s) or can use one or more antennas included on the pole 360 (or other mounting entity (e.g., building, drone, etc.) to which the camera system 310 is mounted or proximate).

The system 300 further includes a server 320 configured to perform video surveillance based on face recognition with larger pose face frontalization. Such surveillance can be with respect to a secured object such as, for example, a secured facility 377. In the example of FIG. 3, the secured facility is an airport. Of course, other secured facilities can also be surveilled in accordance with the present invention. The surveillance can involve detecting the presence of persons 388, recognizing the persons 388, recognizing particular actions performed by the persons 388, and/or performing one or more actions (e.g., in response to recognition/surveillance results). The server 320 can be located remote from, or proximate to, the camera system 310. The server 320 can include a processor 321, a memory 322, and a wireless transceiver 323. The processor 321 and the memory 322 of the remote server 320 can be configured to perform surveillance based on images received from the camera system 310 by the (the wireless transceiver 323 of) the remote server 320. In this way, a list 399 of recognized persons can be provided for any of a myriad of possible surveillance application uses. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth. The server 320 can further include a display device 361 for displaying the list 399 of recognized persons.

Accordingly, some exemplary suitable environments to which the present invention can be applied can include any environments where surveillance can prove useful such as mass transit hubs, border crossings, subways, transportation hubs, airports, ship ports, and so forth. It is to be appreciated that the preceding environments are merely illustrative and, thus, other environments can also be used, while maintaining the spirit of the present invention.

Figure 4:
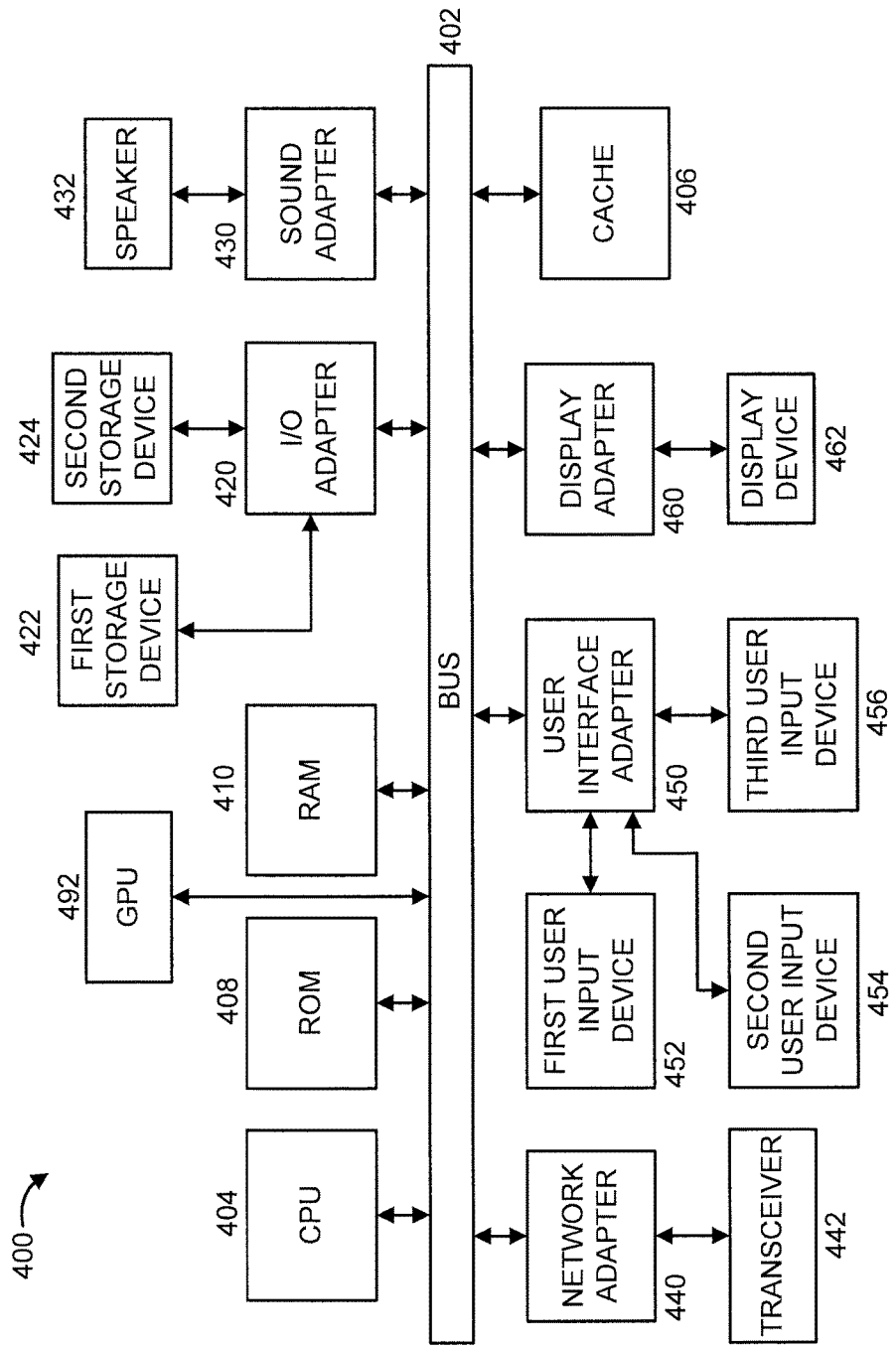
FIG. 4 shows an exemplary processing system to which the present principles may be applied, according to an embodiment of the present principles.

FIG. 4 shows an exemplary processing system 400 to which the present principles may be applied, according to an embodiment of the present principles. In an embodiment, the server 120 of FIG. 1 and/or the server 270 of FIG. 2 and/or the server 320 of FIG. 3 can be implemented, at least in part, by processing system 400.

The processing system 400 includes at least one processor (CPU) 404 operatively coupled to other components via a system bus 502. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
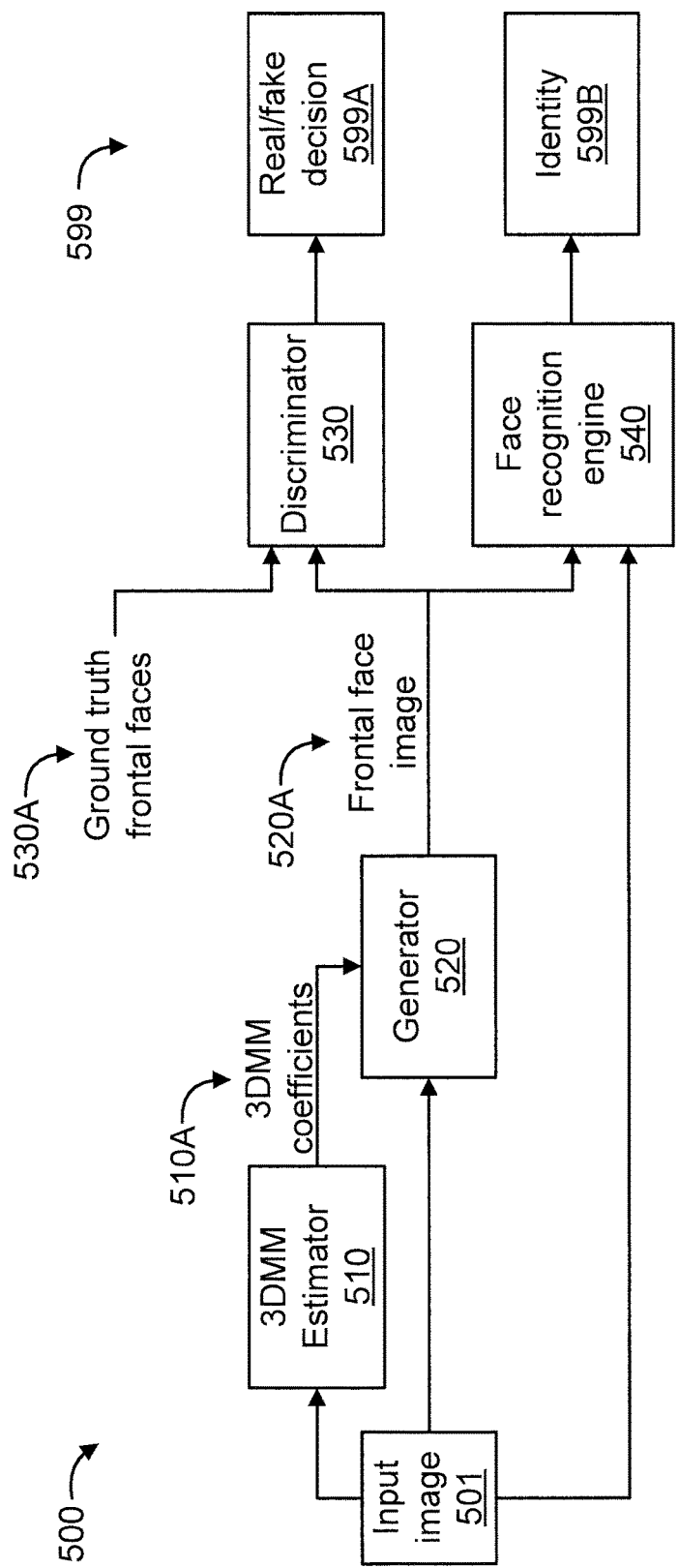
FIG. 5 shows an exemplary framework for larger pose face frontalization, in accordance with an embodiment of the present invention.

Moreover, it is to be appreciated that systems 100, 200, and 300 described above with respect to FIGS. 1, 2, and 3, respectively, are systems for implementing respective embodiments of the present invention. It is to be also appreciated that framework 500 described below with respect to FIG. 5 is a framework for implementing respective embodiments of the present invention. Part or all of processing system 400 may be implemented in one or more of the elements of any of systems 100, 200, and 300 and framework 500.

Further, it is to be appreciated that system 400 may perform at least part of the method described herein including, for example, at least part of method 600 of FIGS. 6-9. Similarly, part or all of any of systems 100, 200, and/or 300 and/or part or all of framework 500 may be used to perform at least part of method 600 of FIGS. 6-9.

FIG. 5 shows an exemplary framework 500 for larger pose face frontalization, in accordance with an embodiment of the present invention.

The framework 500 includes a three-dimensional Morphable Model (3DMM) estimator (also interchangeably referred to herein as a "reconstructor" or "R" in short) 510, a generator (or "G" in short") 520, a discriminator (or "D" in short) 530, and a face recognition engine (also interchangeably referred to herein as a "recognizer" or "C" in short) 540. The framework 500 receives an input image 501 as input, and provides an output 599. The output can include a discriminator decision 599A indicating whether an input is real or fake. The output 500 can include an identify classification 599B for a recognized individual. The constituent elements of framework 500 are described in further detail herein below.

FIGS. 6-9 show an exemplary method 600 for larger pose face frontalization, in accordance with an embodiment of the present principles.

Figure 6:
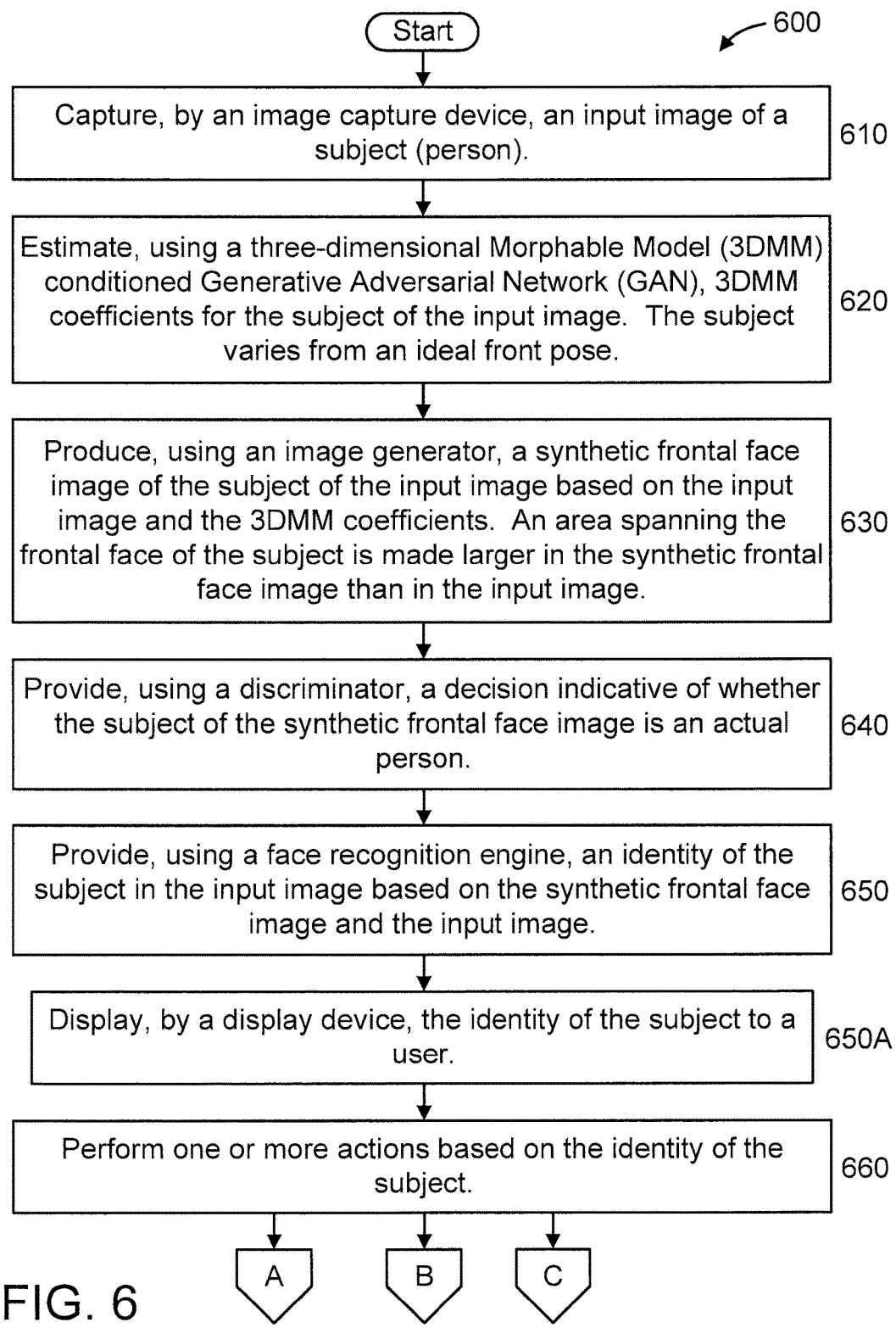
FIGS. 6-9 show an exemplary method for larger pose face frontalization, in accordance with an embodiment of the present principles.

Referring to FIG. 6, at block 610, capture, by an image capture device, an input image of a subject (person).

At block 620, estimate, using a three-dimensional Morphable Model (3DMM) conditioned Generative Adversarial Network (GAN), 3DMM coefficients for the subject of the input image. The subject varies from an ideal front pose.

At block 630, produce, using an image generator, a synthetic frontal face image of the subject of the input image based on the input image and the 3DMM coefficients. An area spanning the frontal face of the subject is made larger in the synthetic frontal face image than in the input image. In an embodiment, block 630 also provides the 3DMM coefficients used as guidance for face frontalization.

At block 640, provide, using a discriminator, a decision indicative of whether the subject of the synthetic frontal face image is an actual person.

At block 650, provide, using a face recognition engine, an identity of the subject in the input image based on the synthetic frontal face image and the input image.

In an embodiment, block 650 can include block 650A.

At block 650A, display, by a display device, the identity of the subject to a user.

At block 660, perform one or more actions based on the identity of the subject. For example, the one or more actions can be directed to one or more of the following: face recognition; video retrieval; video surveillance; and so forth.

In an embodiment, block 660 can include one or more of blocks 660A through 660C.

Figure 7:
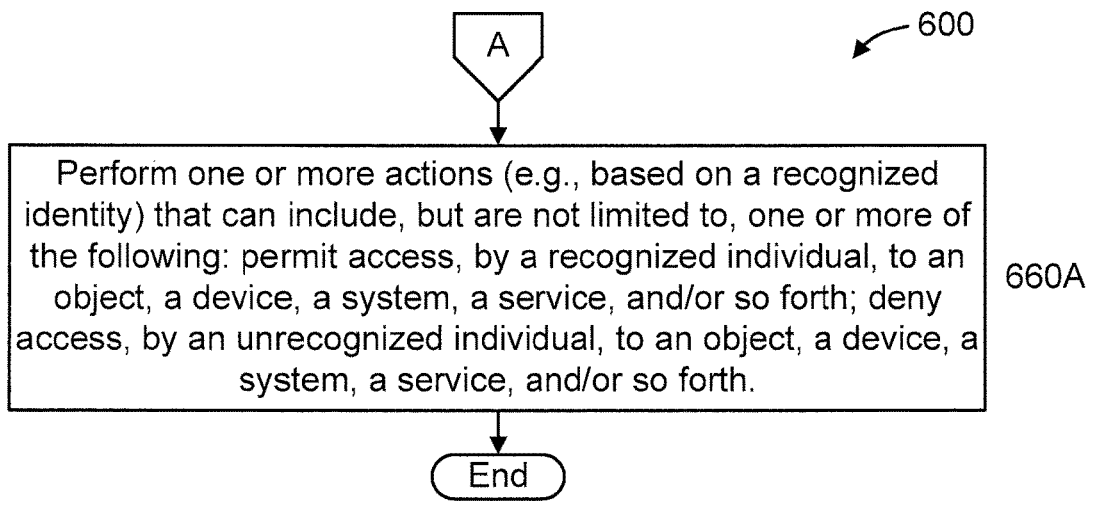

Referring to FIG. 7, at block 660A, corresponding to face recognition, perform one or more actions (e.g., based on a recognized identity) that can include, but are not limited to, one or more of the following: permit access, by a recognized individual, to an object, a device, a system, a service, and/or so forth; deny access, by an unrecognized individual, to an object, a device, a system, a service, and/or so forth.

Figure 8:
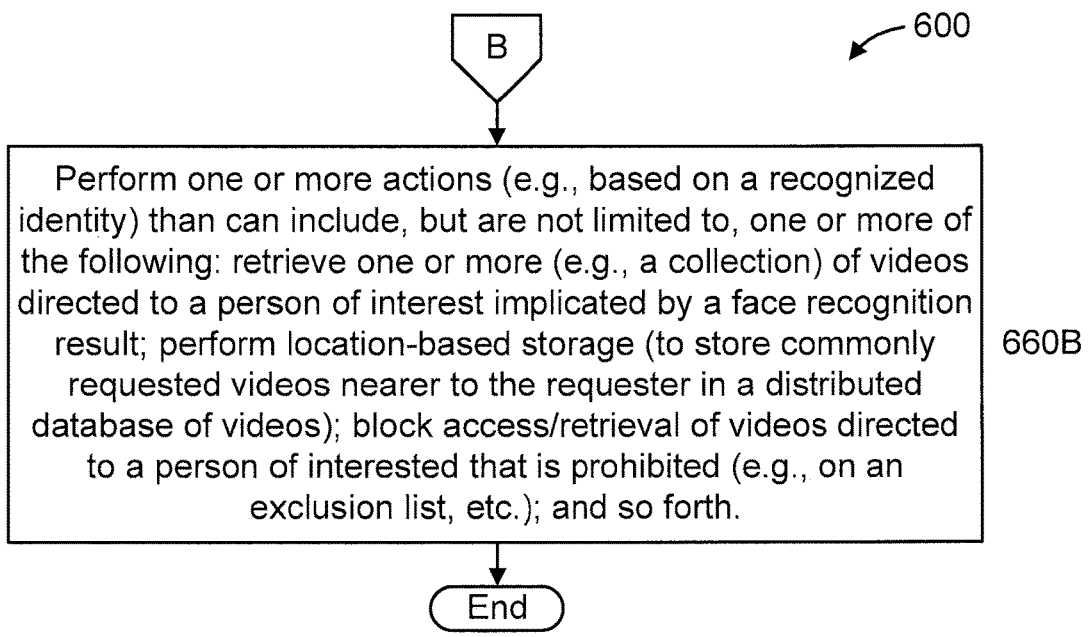

Referring to FIG. 8, at block 660B, corresponding to video retrieval, perform one or more actions (e.g., based on a recognized identity) than can include, but are not limited to, one or more of the following: retrieve one or more (e.g., a collection) of videos directed to a person of interest implicated by a face recognition result; perform location-based storage (to store commonly requested videos nearer to the requester in a distributed database of videos); block access/retrieval of videos directed to a person of interested that is prohibited (e.g., on an exclusion list, etc.); and so forth. The person of interest implicated by the face recognition result can be the subject of the face recognition or, for example, a friend(s) and/or a coworker(s) and/or relative(s) (wherein another list, associated with a list of recognized persons, can be used to associate the recognized persons with other persons such as friends, coworkers, family, etc.).

Figure 9:
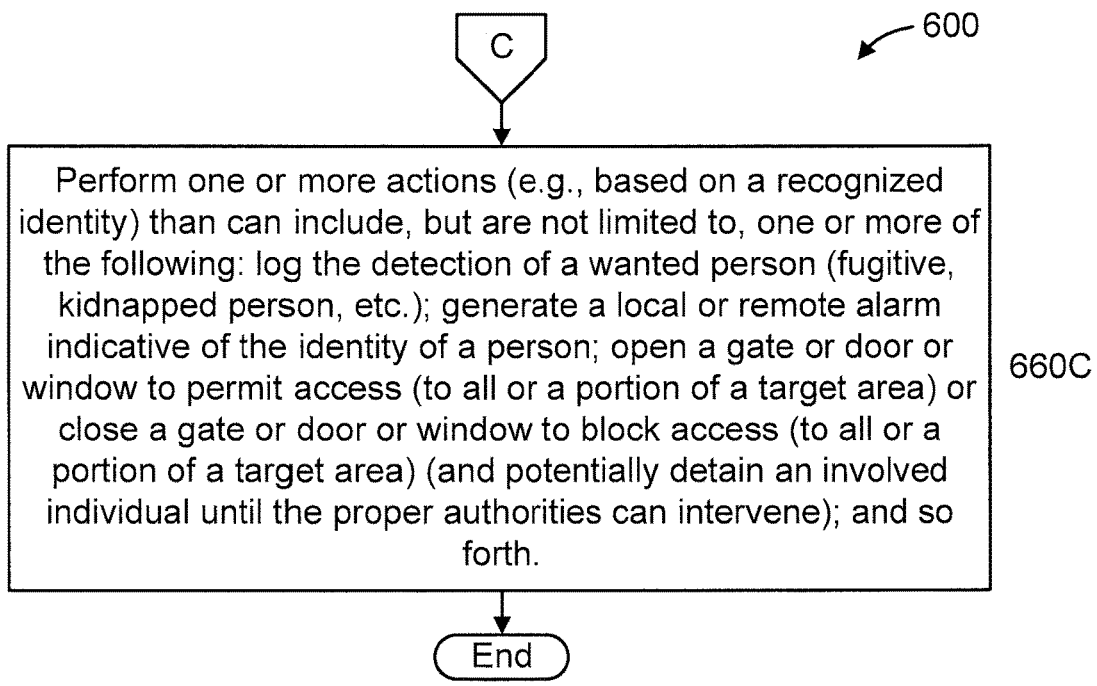

Referring to FIG. 9, at block 660C, corresponding to video surveillance, perform one or more actions (e.g., based on a recognized identity) than can include, but are not limited to, one or more of the following: log the detection of a wanted person (fugitive, kidnapped person, etc.); generate a local or remote alarm indicative of the identity of a person; open a gate or door or window to permit access (to all or a portion of a target area) or close a gate or door or window to block access (to all or a portion of a target area) (and potentially detain an involved individual until the proper authorities can intervene); and so forth.

Regarding block 660 and its "sub-blocks", the preceding actions mentioned with respect thereto are merely illustrative and, thus, other actions can also be performed in response to face recognition results. As is evident to one of ordinary skill in the art, the action(s) taken is(are) dependent upon the type of application to which the present invention is applied.

Referring back to FIG. 5, framework 500 includes four elements. The reconstructor R 510 takes an input image 501 and predicts its 3DMM coefficients 510A. The generator G 520 takes the input image 501 and the estimated 3DMM coefficients 501A to produce a frontal face 520A of the same subject. The discriminator D 530 distinguishes between the generated 520A and the ground truth frontal faces 530A. The recognizer C 540 regularizes the identity classification of the input 501 and the fake (i.e., generated) images 520A.

To achieve the above task, we form a training set $\mathbb{D} = \{x_i, x_i^g, p_i^g, y_i\}_{i=1}^N$ with N samples where each sample includes an input image $x_i$ with arbitrary pose, the ground truth frontal face $x_i^g$, the ground truth 3DMM coefficients $p_i^g$, and the identity label $y_i$. The sample index i is eliminated for clarity herein after.

A description will now be given regarding the face recognition engine (reconstructor or C) 540 of FIG. 5, in accordance with an embodiment of the present invention.

A 3D Morphable Model (3DMM) defines the 3D face shape and texture in the Principal Component Analysis (PCA) space as follows:

$$S = \bar{S} + A_{id}\alpha_{id} + A_{exp}\alpha_{exp},$$

$$T = \bar{T} + A_{tex}\alpha_{tex} \quad (1)$$

where S is the 3D shape coordinate that is computed as the linear combination of the mean shape $\bar{S}$, the shape basis $A_{id}$, and the expression basis $A_{exp}$. T is the texture that is the linear combination of the mean texture $\bar{T}$ and the texture basis $A_{tex}$. The 3DMM fitting process is to estimate the coefficients $\{\alpha_{id}, \alpha_{exp}, \alpha_{tex}\}$ that defines a unique 3D face.

A 3DMM is applied for face alignment where a weak perspective projection model is used to project the 3D shape into the 2D space. A projection matrix $m \in \mathbb{R}^{2 \times 4}$ (based on pitch, yaw, roll, scale, and 2D translations) is calculated to represent the pose of an input face image.

Let $p = \{m, \alpha_{id}, \alpha_{exp}, \alpha_{tex}\}$ denote the 3DMM coefficients. The target of the reconstructor R is to estimate $p = R(x)$ given an input image x. We use a Convolutional Neural Network (CNN) model for this regression task. We apply z-score normalization to each dimension of the parameter before training. The weighted parameter distance cost is used as follows:

$$\min_R E_R = (p - p^g)^T W(p - p^g) \quad (2)$$

where W is the importance matrix whose diagonal is the weight of each parameter.

A description will now be given regarding the generator G 520 of FIG. 5, in accordance with an embodiment of the present invention.

The generator G takes 520 both the input image 501 and the estimated 3DMM coefficients 510A and aims to generate a frontal face 520A of the same subject. The motivation is to leverage 3DMM for face frontalization. Since the 3DMM is limited to a linear space, the coefficients 310A alone are not sufficient to decode a frontal face image that maintains the high-frequency identity information. The input image 501 is used to compensate the loss of the discriminative identity features in the reconstructor R 510.

In order to combine the 3DMM coefficients p and the input image x, we apply one convolutional layer and one pooling layer to x to reduce the spatial dimension, and three full convolutional layers to p to increase its spatial dimension. The outputs are then concatenated, which includes the discriminative identity features encoded from the input image 501 and the 3DMM information that are used as guidance for face frontalization.

As shown in FIG. 5, the fused feature maps go through an encoder-decoder structured network to synthesize a frontal face $x^f = G(x, p)$. The first objective in training G is to minimize the difference of the synthesized frontal face $x^f$ and the ground truth frontal face as follows:

$$\min_G E_{G_1} = \|x^f - x^g\|_1 \quad (3)$$

The second objective is to minimize the spatial total variance norm as follows:

$$\min_G E_{G_2} = \frac{1}{|\Omega|} \int_\Omega |\nabla G(x, p)| du \quad (4)$$

A description will now be given regarding the discriminator D 530 of FIG. 5, in accordance with an embodiment of the present invention.

A Generative Adversarial Network (GAN) has been widely applied for image generation. It is formulated as a two-player game between a generator and a discriminator. The generator G 520 synthesizes a frontal face image 520A. The discriminator D 530 distinguishes between the generated face 520A and the ground truth frontal face 530A. Note that in a conventional GAN, all images used for training are considered as real samples. However, we limit the real/fake definition to be the face images with frontal-view only.

Therefore, the generator G 520 is guided to generate both realistic and frontal face images.

The objective for training D is to minimize the classification loss between the real image $x^g$ and the fake image $x^f$ that is generated by the generator G 520. D includes five convolutional layers and one linear layer that generates a 2-d vector with each dimension representing the probability of the input to be real or fake. During training, D is updated with two batches of samples in each iteration. The following objective is maximized as follows:

$$\max_D E_D = \log(D(x^g)) + \log(1 - D(x^f)) \quad (5)$$

On the other hand, G aims to fool D to classify the fake image to be real with the following objective:

$$\max_G E_{G_3} = \log(D(x^f)) \quad (6)$$

The competing between G and D improves both modules. In the early stage when the face images are not fully frontalized, D will focus on the pose of the face to make the real/fake decision which, in turn, helps G to generate a frontal face. In the later stage when the face images are frontalized, D will focus on the subtle details of the frontal faces for classification, which guides G to generate a realistic frontal face that is difficult to achieve with the supervision of only Equations (3) and (4).

A description will now be given regarding the face recognition engine (recognizer) 540 of FIG. 5, in accordance with an embodiment of the present invention.

The main challenge in large-pose face frontalization is to maintain the original identity in the frontalized face. This is a difficult task due to self-occlusion in the profile faces. Our discriminator can only distinguish whether an input image is realistic and with frontal pose without considering if the synthesized frontal face is with the same identity of the input image or not. Although we have L1-norm and total variance norm for face generation, these two losses treat each pixel equally that will result in the loss of discriminative identity features. Therefore, we use a recognizer module C 540 to regularize the identity of the fake image 520A.

The network structure of C 540 includes 10 convolutional layers and 5 pooling layers that result in a 320-d identity feature vector denoted as h. A linear layer and a softmax layer are applied on h to generate $C(x) \in \mathbb{R}^{N^d \times 1}$ where $N^d$ is the number of subjects in the training set. Each dimension $C_j(x)$ represents the probability of the input image being the jth subject. The objective for training C 540 is to maximize the probability of x being classified as the ground truth identity y as follows:

$$\max_C E_C = \log(C_y(x)) \quad (7)$$

Similarly, the generator G 520 aims to fool C 540 to classify the fake image to be in the same identity as the input image 501. If the identity label of the input image 501 is not available, we regularize the extracted identity features $h^f$ of the fake image to be similar to that of the input image 501 as follows:

$$\min_G E_{G_4} = \begin{cases} \log(C_y(x^f)), & \exists y \\ \|h^f - h\|_2^2, & \nexists y \end{cases} \quad (8)$$

During training, C 540 is updated with the input images to maintain a good recognizer, and the loss from the fake images are back-propagated to update the generator G 520.

A description will now be given regarding training strategies, in accordance with an embodiment of the present invention.

The above four elements work together for large-pose face frontalization. The generator G 520 is the most crucial part. However, in order to train a satisfying G 520, we need an accurate 3DMM coefficient estimation from R 510 and precise guidance from D 530 and C 540 for what kind of face image to generate. Obviously it is hard to train such a complicated network from scratch, therefore it is important that each part is initialized with some pre-trained networks.

The reconstructor R 510 is trained for 3DMM coefficients estimation. The generator G 520 is trained with ground truth 3DMM coefficients with the loss in Equations (3) and (4). The recognizer C 540 is trained with a large dataset for identity classification. Finally, the above networks are used as initialization for R, G, C and trained jointly with our discriminator D 530 using all the above supervisions. The reason for D 530 to be trained from scratch is that we believe it is an easy task to start with and the learning process needs to be adapted to the quality of the synthesized images.

Our training process primarily includes the following three steps. First, we freeze all convolutional layers in C 540 and fine tune the last linear layer on our training set $\mathbb{D}$. Second, we start to update C 540 when the visual quality of the fake image looks reasonable. Third, we use the fake images to update C 540 in order to increase its robustness after the fake images in the training set achieve comparable face recognition performance to the input images. These steps are used to maintain a well-performing C 540 for the sake of guiding G 520 to generate an identity-preserved frontal face.

A description will now be given regarding some of the many attendant advantages provided by various embodiments the present invention.

The present invention provides an approach from the image level to frontalize faces and has shown promise in boosting state-of-the-art recognition performance.

The present invention also provides a preliminary frontal face image for other face analysis tasks such as face editing.

The 3DMM deep model provides the frontalized face shape and appearance information which alleviates the difficulty of frontalization and shows much better performance than without such 3DMM deep model.

The symmetry loss for the generator effectively regularizes the generation to be more realistic as human faces show statistical symmetry across left and right sides of a face.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A video retrieval system, comprising:
    a requesting server, configured to retrieve a set of video sequences from a remote database of multiple video sequences responsive to an input text specifying a face recognition result in a form of an identity of a subject of an input image,
    wherein the face recognition result is determined by a processor of the requesting server being configured to
        estimate, using a three-dimensional Morphable Model (3DMM) conditioned Generative Adversarial Network (GAN), 3DMM coefficients for the subject of the input image, wherein the subject varies from an ideal front pose;
        produce, using an image generator, a synthetic frontal face image of the subject of the input image based on the input image and the 3DMM coefficients, wherein an area spanning the frontal face of the subject is made larger in the synthetic frontal face image than in the input image;
        provide, using a discriminator, a decision indicative of whether the subject of the synthetic frontal face image is an actual person; and
        provide, using a face recognition engine, the identity of the subject in the input image based on the synthetic frontal face image and the input image.

2. The video retrieval system of claim 1, wherein the face recognition engine regularizes the identity of the subject in the input image relative to the synthetic frontal face image.

3. The video retrieval system of claim 1, wherein the discriminator provides the decision by distinguishing the synthetic frontal face image from at least one ground truth frontal face image.

4. The video retrieval system of claim 1, wherein the discriminator is pre-trained to minimize a classification loss between the input image and the synthetic frontal face image.

5. The video retrieval system of claim 1, wherein the discriminator comprises a linear layer that generates a two-dimensional vector, with each of the two dimensions representing a respective probability of the subject of the synthetic frontal face image being the actual person.

6. The video retrieval system of claim 1, wherein the image generator is configured to mislead the discriminator to classify synthetic frontal face images to be real images using an objective function in order to improve both generator performance and face recognition engine performance.

7. The video retrieval system of claim 1, wherein the face recognition engine is pre-trained to maximize a probability of the subject of the input image being classified as a one of a plurality of ground truth identities.

8. The video retrieval system of claim 1, wherein the generator is guided to generate the synthesized frontal face image so as to include an identity-preserved frontal face relative to the subject of the input image.

9. The video retrieval system of claim 1, wherein the image generator generates the synthetic frontal face image using a symmetry loss to account for symmetry variations between opposing face sides.

10. The video retrieval system of claim 1, wherein the 3DMM is configured to define a three-dimensional face shape and texture in a principal component analysis space.

11. The video retrieval system of claim 1, wherein the input image is used by the 3DMM to compensate for a loss of discriminative identity features of the subject.

12. The video retrieval system of claim 1, wherein the 3DMM conditioned GAN uses a 3DMM fitting process to estimate the 3DMM coefficients for the input image.

13. The video retrieval system of claim 1, wherein each of the video sequences in set retrieved from the remote database of multiple video sequences include the subject of the input image in common.

14. The video retrieval system of claim 1, wherein the database of multiple video sequences comprises a distributed video database implemented by a set of servers, and wherein the processor is further configured to perform location-based storage to store commonly requested videos in a portion of the distributed video database nearer to the requesting server.

15. The video retrieval system of claim 1, wherein the processor is further configured to block access to any of the multiple video sequences of the database responsive to the identity of the subject of the input image being on a restricted access list.

16. The video retrieval system of claim 1, further comprising associating the subject of the input image with a list of other persons selected from the group consisting of friends, coworkers, and family members, and wherein other video sequences that include the other persons are also retrieved from the database and provided to the requesting server.

17. A computer-implemented method for video retrieval, comprising:

configuring a requesting server to retrieve a set of video sequences from a remote database of multiple video sequences responsive to an input text specifying a face recognition result in a form of an identity of a subject of an input image, wherein the face recognition result is determined by
- estimating, by a processor of the requesting server using a three-dimensional Morphable Model (3DMM) conditioned Generative Adversarial Network (GAN), 3DMM coefficients for the subject of the input image, wherein the subject varies from an ideal front pose;
- producing, by the processor using an image generator, a synthetic frontal face image of the subject of the input image based on the input image and the 3DMM coefficients, wherein an area spanning the frontal face of the subject is made larger in the synthetic frontal face image than in the input image;
- providing, by the processor using a discriminator, a decision indicative of whether the subject of the synthetic frontal face image is an actual person; and
- providing, by the processor using a face recognition engine, the identity of the subject in the input image based on the synthetic frontal face image and the input image.

18. The computer-implemented method of claim 17, wherein the face recognition engine regularizes the identity of the subject in the input image relative to the synthetic frontal face image.

19. The computer-implemented method of claim 17, wherein the discriminator provides the decision by distinguishing the synthetic frontal face image from at least one ground truth frontal face image.

20. A computer program product for video retrieval, the computer program product comprising a non-transitory computer readable storage medium having program instructions embodied therewith, the program instructions executable by a computer to cause the computer to perform a method comprising:

configuring a requesting server to retrieve a set of video sequences from a remote database of multiple video sequences responsive to an input text specifying a face recognition result in a form of an identity of a subject of an input image, wherein the face recognition result is determined by
- estimating, by a processor of the requesting server using a three-dimensional Morphable Model (3DMM) conditioned Generative Adversarial Network (GAN), 3DMM coefficients for the subject of the input image, wherein the subject varies from an ideal front pose;
- producing, by the processor using an image generator, a synthetic frontal face image of the subject of the input image based on the input image and the 3DMM coefficients, wherein an area spanning the frontal face of the subject is made larger in the synthetic frontal face image than in the input image;
- providing, by the processor using a discriminator, a decision indicative of whether the subject of the synthetic frontal face image is an actual person; and
- providing, by the processor using a face recognition engine, the identity of the subject in the input image based on the synthetic frontal face image and the input image.

* * * * *